United States Patent [19]

Huniu et al.

[11] 4,453,914
[45] Jun. 12, 1984

[54] LOW HEAT LOSS LASER COMBUSTION CHAMBER

[75] Inventors: Sam Huniu, Seal Beach; William C. Bailey, Torrance, both of Calif.

[73] Assignee: The United States of America as represented by the Secretary of the Air Force, Washington, D.C.

[21] Appl. No.: 449,921

[22] Filed: Dec. 15, 1982

[51] Int. Cl.³ .............................................. F23R 1/06
[52] U.S. Cl. .................................... 431/121; 431/158; 431/177; 431/190; 372/89
[58] Field of Search .............. 431/158, 121, 174, 177, 431/190; 372/89

[56] References Cited

U.S. PATENT DOCUMENTS

| | | | |
|---|---|---|---|
| 3,251,666 | 5/1966 | Levecque et al. | 431/158 |
| 3,540,853 | 11/1970 | Kulling et al. | 431/190 |
| 3,908,175 | 9/1975 | Damm | 331/94.5 |
| 4,011,522 | 3/1977 | Falk | 331/94.5 G |
| 4,108,591 | 8/1978 | Egan et al. | 431/121 |
| 4,220,933 | 9/1980 | Kuhn, Jr. | 331/94.5 |
| 4,236,123 | 11/1980 | Richardson et al. | 331/94.5 |
| 4,267,523 | 5/1981 | Brown | 331/94.5 C |

Primary Examiner—Carroll B. Dority, Jr.
Attorney, Agent, or Firm—Donald J. Singer; Stanton E. Collier

[57] ABSTRACT

A low heat loss combustion chamber for a gain generator assembly is shown. The gain generator assembly operates in a cylindrical gas laser. The combustion chamber includes a plurality of primary rings having fuel and oxidizer injectors therein as well as primary nozzles. End caps attached to the primary rings contain reaction products so that they flow through the primary nozzles on the primary rings past a secondary injector array into a lasing cavity of the gas laser.

10 Claims, 5 Drawing Figures

LOW HEAT LOSS LASER COMBUSTION CHAMBER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to cylindrical lasers, and more particularly, to a gain generator assembly used in the cylindrical laser to produce a lasing gas.

One particular prior art gain generator assembly is shown in U.S. Pat. No. 4,220,933, entitled "Baffle/Nozzle Array For Cylindrical Lasers", and assigned to U. S. Government. In the gain generator assembly described in the above-mentioned patent, the fuel and oxidizer are fed into a centerbody that provides channels for fluid flow to injectors and also supports a nozzle assembly having the fuel injectors therein. The reaction of the fuel and oxidizer takes place radially beyond the nozzle assembly in a combustion chamber shaped as an annular ring. The use of an annular combustion chamber increases the surfaces which transfer heat from the lasing gas and thus require more reactants to compensate for the heat loss. This construction also requires that surfaces exposed to the lasing gas be made from inconel, nickel, stainless steel or copper thus increasing fabrication cost and weight.

Another type of gain generator assembly uses a primary ring for injecting the fuel and oxidizer radially outward into an annular combustion chamber formed between the primary rings and secondary rings having a primary nozzle and a secondary nozzle array thereon. The reactants flow outward past the primary nozzles and the secondary nozzles whereupon other compositions may be injected for increased lasing action. The fuel and oxidizer are routed to the primary rings through struts located in the combustion chamber and connecting the primary and secondary rings. The combustion chamber is formed between an inner shell defined by the primary rings and an outer shell formed by the primary nozzle of the secondary rings. End caps enclose the annular combustion chamber for directing and containing the reaction products. The centerbody of this assembly is the primary rings. Because the annular combustion chamber is located between the inner and outer shells, the same problems of heat transfer and combustion occur as noted above. Furthermore, the struts connecting the shells create gas density variations within the chamber and reduce the laser beam forming effectiveness.

The present invention is directed toward providing an improved combustion chamber for a cylindrical laser having a gain generator assembly in which the above undesirable characteristics are minimized.

SUMMARY OF THE INVENTION

The present invention provides an improved combustion chamber for a laser gain generator assembly of a cylindrical gas laser to overcome the problems noted above and to provide additional advantages noted hereinafter.

The laser gain generator of this invention has a plurality of primary rings which are combined to form a cylindrical shaped cavity. End caps attached to the primary rings and a laser housing enclose the cylindrical cavity forming a combustion chamber without a centerbody or struts therein as in prior devices. The primary ring combines the primary injectors and primary nozzles and has fluid channels formed therein for carrying fuel and oxidizer to the primary injectors by the primary injectors. The fuel and oxidizer are injected by the primary injectors toward the centerline of the combustion chamber where they react forming reaction products. Because of increased pressure and temperature a counter flow of reaction products is set up such that the products flow past the primary nozzles which are a functional part of the primary rings and past the secondary injector array into a lasing cavity where additional compositions are injected by the secondary injector array. Fuel and oxidizer are routed to the gain generator assembly through supply manifolds to the primary ring feed/support struts. Upon entering the primary ring the fuel and oxidizer are used to cool the ring through channels appropriately placed near heated surfaces. Fuel and oxidizer distribution manifolds in the primary rings cause the fuel and oxidizer to be expelled from the primary injectors into the combustion chamber in a controlled manner. A laser cavity fuel feed manifold supplies fuel to the secondary injector array. The gain generator assembly is mounted in a cylindrical cavity of the laser housing.

It is therefore an object of this invention to provide for a low heat loss laser combustion chamber;

It is a further object of this invention to provide a primary ring structure that has the primary injectors and primary nozzles as an integral part thereof;

It is another object of this invention to provide a low heat loss laser combustion chamber that has no centerbody and no feed/support struts therein; and It is a still further object of this invention to provide a low heat loss laser combustion chamber that utilizes aluminum in its construction.

These and many other objects and advantages of the present invention will be readily apparent to one skilled in the pertinent art from the following detailed description of a preferred embodiment of the invention and related drawings.

DETAILED DESCRIPTION OF THE PREFERRED EMBODIMENT

Figure 1:
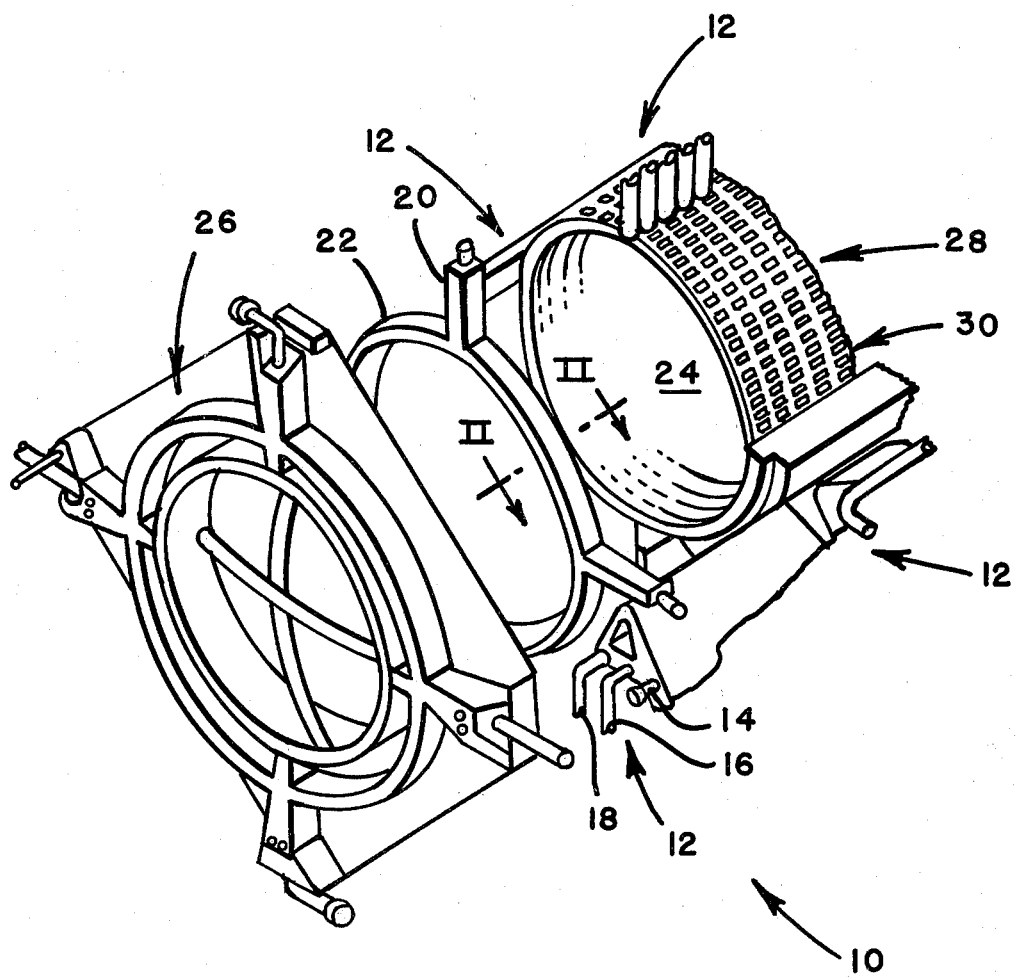
FIG. 1 is an exploded partial view of a laser gain generator assembly showing external fluid manifolds.

Referring to FIG. 1, a cylindrical laser gain generator 10 is shown in an exploded pictorial view. Generator 10 is mounted in a conventional housing (not shown) having a lasing cavity (not shown) bounded by conventional reflectors forming an optical lasing cavity.

Reacting fluids are channeled to generator 10 through the housing, manifolds, and struts by conventional tubing techniques. Fuels and oxidizer fluids enter supply manifolds 12, four of which are only partially shown. Supply manifolds 12 include a fuel supply manifold 14, a cavity fuel supply manifold 16, and an oxidizer supply manifold 18. Manifolds 12 are connected to feed/support struts 20 in a conventional manner, four on each primary ring 22 and located about ninety degrees from adjacent struts 20. Struts 20 have fluid channels therein (not shown) that allow fluid to flow from manifolds 12 to primary rings 22.

A plurality of primary rings 22 are connected to form a modular ring assembly 28, FIG. 1, that forms a cylindrical combustion area 24 therein. Conventional closure/support caps 26 (only one shown) are positioned at the ends of area 24 and are used to contain the reaction products as well as support modular ring assembly 28 within the housing. A conventional secondary injector array 30 is attached to the exterior of primary rings 22 and functions to inject the cavity fuel into the reaction products entering the lasing cavity, and further directs the flow of reactants from area 24 in a uniform manner.

Figure 2:
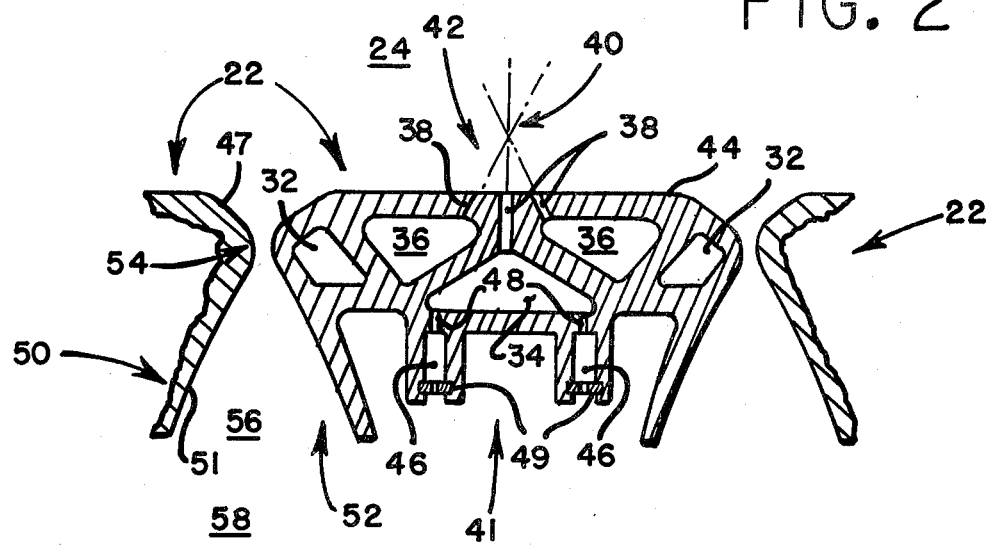
FIG. 2 is a cross section of a primary ring of this invention shown in FIG. 1 taken along lines II—II of FIG. 1.

The interior details of primary ring 22 are illustrated in detail in FIG. 2. Ring 22 is constructed of preferably aluminum or other lightweight material which is possible by minimizing contact with high temperature products. Each strut 20 supplies fluids to a ninety degree sector of ring 22 and is connected to rings 22 in a conventional manner.

The fluids are fuel and oxidizer and flow through supply manifolds 12, struts 20, and into primary rings 22. The fuel after leaving struts 20 enters cooling channels 32 and flows through a 90 degree angle and then reverses direction of flow by entering a fuel distribution channel 34. The oxidizer enters rings 22 at 90 degrees to the location as the fuel enters for that sector and flows through distribution channels 36 in the opposite direction as the fuel in distribution channel 34. From distribution channels 34 and 36, fuel and oxidizer are metered through injector orifices 38. Orifices 38 are so oriented that reaction between the fuel and oxidizer takes place in an impingement zone 40. A triplet combination 42 of orifices 38 is preferred having two oxidizer orifices 38 on the outside and a fuel orifice 38 in the center. A plurality of triplet combinations 42 are located along an inside surface 44 of ring 22, inside surface 44 being flat along a direction parallel to a major axis of ring 22. Purge channels 46 are used to flush out reaction products stagnating in a base area 41 when the laser is operating. Purge channels 46 bleed fuel from distribution channel 34 by first purge orifices 48. The bled fuel is injected into base area 41 through sintered metal plates 49. Sintered metal plates 49 are located circumferentially about ring 22.

In combination with adjacent rings 22, each ring 22 has two side walls 50 wherein each wall 50 forms one half of a nozzle 52 with an inlet surface 47, a throat 54, and an outlet surface 51. The combustion products attain sonic velocity at throat 54 and supersonic velocity in area 56 before entering a lasing cavity 58.

Figure 3:
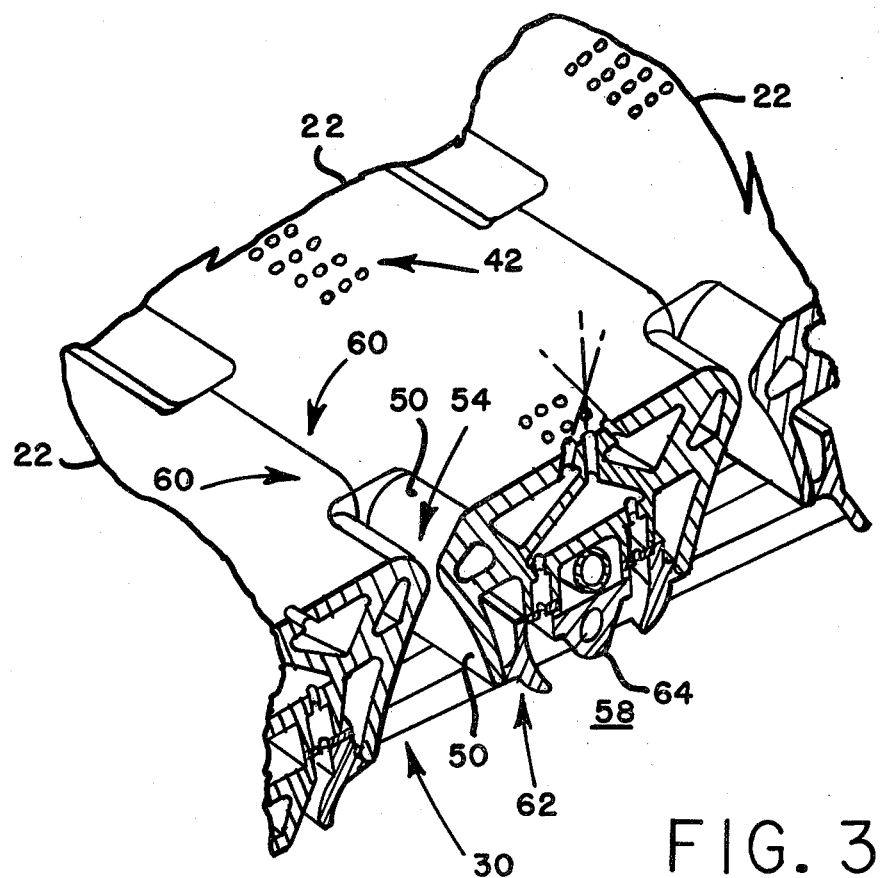
FIG. 3 is a pictorial view and cross section of several primary rings as combined to form the combustion chamber of this invention.

Referring to FIG. 3, a pictorial view of several rings 22 is shown. The separation between side walls 50 having throat 54 thereon is maintained by interface pads 60 formed as an integral part of rings 22. The grouping of triplet combination 42 is preferably in groups (as shown in FIG. 3) but uniform spacing is also possible. On an outside surface 62 of rings 22, secondary injector array 30 is fixedly mounted by conventional means and further connected to receive cavity fuel from struts 20. Secondary injector array 30 injects cavity fuel into lasing cavity 58. The cavity fuel is routed through supply manifold 12, struts 20, and cavity fuel distribution manifold 64, only one shown in FIG. 3, to array 30. The fluid connection between these elements is not further detailed because it is conventional in nature.

The oxidizer is preferably $NF_3$, the fuel for ring 22 is preferrably a mixture of $D_2$ and He, and the cavity fuel is preferably $H_2$.

Figure 4:
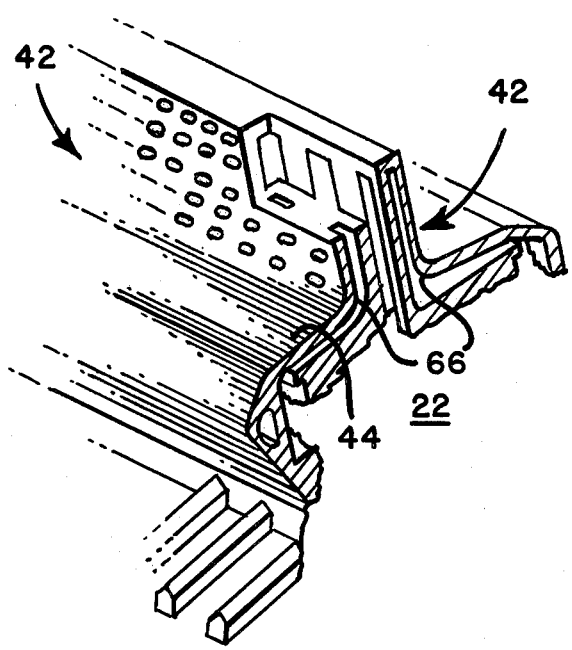
FIGS. 4A & 4B are alternative designs of injector surfaces of the primary rings of this invention.
Figure 4:
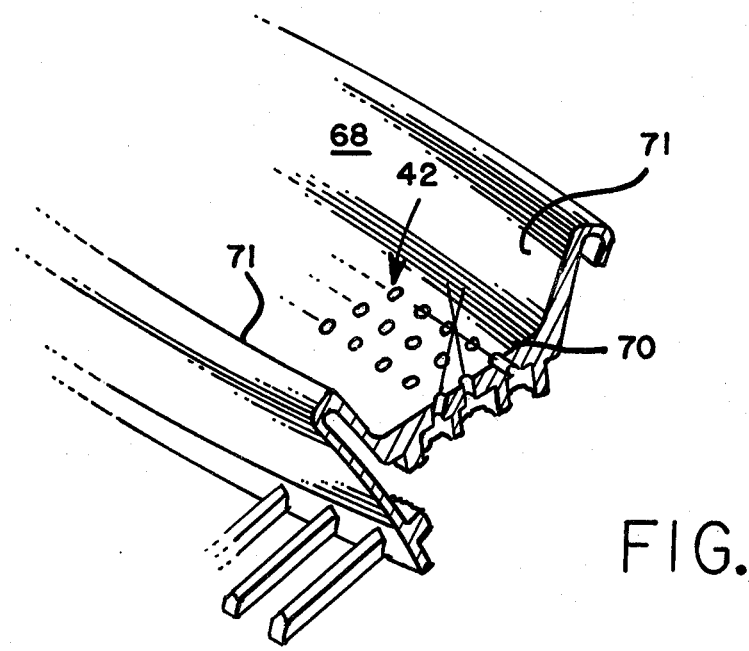

As shown in FIGS. 2 and 3, triplet combination 42 injects fluid to combustion area 24 from inside surface 44 of ring 22. Inside surface 44 is flat parallel to the major axis of cylindrical combustion area 24 and is circular perpendicular thereto. Alternate shapes of inside surface are shown in FIGS. 4A and 4B. FIG. 4A shows triplet combinations 42 mounted in opposite vertical sides 66 of a frustum structure 43 mounted on an an inside surface 44 of ring 22.

FIG. 4B shows ring 22 having a recessed channel 68 therein with a flat bottom 70 with slanting walls 71. Triplet combinations 42 are located in flat bottom 70. Fluid channels supplying either of the alternative shapes are not further detailed in light of the channels of ring 22.

Clearly, many modifications and variations of the present invention are possible in light of the above teachings and it is therefore understood, that within the inventive scope of the inventive concept, the invention may be practiced otherwise than specifically claimed.

What is claimed is:

1. A low heat loss combustion chamber for use in a gas laser comprising:

a plurality of primary rings fixedly positioned to form a modular ring assembly, each of said primary rings having injection orifices for a fuel and an oxidizer and shaped to form a primary nozzle in cooperation with an adjacent primary ring, said modular ring assembly having an inside cylindrical wall forming a cylindrical combustion area, said fuel and said oxidizer reacting to form reaction products in said combustion area, and said reaction products flowing from said combustion area through a plurality of primary nozzles to a lasing cavity external to said modular ring assembly;

means for containing and directing said reaction products and supporting said combustion chamber in a housing of said gas laser, said means fixedly attached to ends of said modular ring assembly; and means for providing fluids to said modular ring assembly, the fluids including fuel and oxidizer.

2. A low heat loss combustion chamber as defined in claim 1 wherein each of said primary rings includes:

means for cooling said prmary rings from heat created by combustion of said fuel and said oxidizer;

means for distributing said fuel and said oxidizer within said primary rings;

means for purging a base area of said primary rings of reaction products of said fuel and said oxidizer, said purging means being connected to said distributing means; and means for injecting said fuel and said oxidizer in said distributing means to said combustion area.

3. A low heat loss combustion chamber as defined in claim 2 wherein each of said primary rings includes a body, said body having an inside surface facing a major axis of said ring, side walls being connected to said inside surface and the base area, each of said side walls having primary rings adjacent thereto being formed in a shape of a half nozzle, said half nozzle having an inlet surface and an outlet surface formed on said side wall with a throat between said inlet and said outlet surfaces, said inside surface having said injection orifices formed therein.

4. A low heat loss combustion chamber as defined in claim 3 wherein said inside surface is essentially flat in between said inlet surfaces.

5. A low heat loss combustion chamber as defined in claim 3 wherein said inside surface forms a recessed channel in said primary ring, said channel having slanting walls and essentially a flat bottom between said slanting walls with said injection orifices in said bottom.

6. A low heat loss combustion chamber as defined in claim 3 wherein said inside surface is essentially flat except for a frustum shaped body having injection orifices located in said frustum.

7. A low heat loss combustion chamber as defined in claim 3 wherein said body of said ring has formed therein a plurality of channels and a plurality of orifices, said cooling means including two cooling channels in said ring, one of said cooling channels located near each of said side wall forming said throat and said inlet surface of said nozzle; said distributing means including a fuel distribution channel centrally located in said ring, said fuel first flowing through said cooling channels in one direction and then reversing flow direction and flowing through said fuel distribution channel, and two oxidizer channels; said injecting means including a plurality of first injection orifices being located along the length of said ring and communicating between said fuel distribution channel and said combustion chamber, and a plurality of oxidizer injection orifices being located along the length of said ring and communicating between said oxidizer channels and said combustion chamber; said purging means including two channels, said purge channels having a plurality of sintered plates for communicating between said fuel distribution channels, said purge channels, and said base area of said primary ring.

8. A low heat loss combustion chamber as defined in claim 3 wherein said primary injection fuel is $D_2/He$ and said oxidizer is $NF_3$.

9. A low heat loss combustion chamber as defined in claim 3 wherein said primary injection body is made of a lightweight metal.

10. A low heat loss combustion chamber as defined in claim 9 wherein said metal is aluminum.

* * * * *